United States Patent [19]
Harmsen et al.

[11] Patent Number: 5,135,363
[45] Date of Patent: Aug. 4, 1992

[54] MINIATURIZED DIRECT CURRENT FAN

[75] Inventors: Siegfried Harmsen, St. Georgen; Rolf Müller, Munich; Günter Wrobel, Villingen, all of Fed. Rep. of Germany

[73] Assignee: Papst-Motoren GmbH & Co. KG, Fed. Rep. of Germany

[21] Appl. No.: 724,840

[22] Filed: Jul. 2, 1991

Related U.S. Application Data

[63] Continuation of Ser. No. 377,748, Jul. 6, 1989, Pat. No. 5,028,216, which is a continuation of Ser. No. 68,741, Jun. 25, 1987, abandoned, which is a continuation of Ser. No. 845,481, Mar. 27, 1986, abandoned, which is a continuation of Ser. No. 634,677, Jul. 30, 1984, abandoned, which is a continuation of Ser. No. 466,960, Feb. 16, 1983, abandoned.

[30] Foreign Application Priority Data

Nov. 9, 1982 [DE] Fed. Rep. of Germany ....... 3241406

[51] Int. Cl.$^5$ .............................................. F04B 17/00
[52] U.S. Cl. ...................................... 417/354; 417/352; 417/353; 417/410; 417/423.1
[58] Field of Search ............... 417/354, 353, 352, 410, 417/423.1, 423.7, 423.12

[56] References Cited

U.S. PATENT DOCUMENTS

| 3,194,165 | 7/1965 | Sörlin | 417/353 |
| 4,164,690 | 8/1979 | Muller et al. | 417/410 |
| 4,564,335 | 1/1986 | Harmsen et al. | 417/354 |
| 4,618,315 | 10/1986 | Papst et al. | 417/354 |
| 4,806,081 | 2/1989 | Harmsen et al. | 417/354 |
| 5,028,216 | 7/1991 | Harmsen et al. | 417/354 |

FOREIGN PATENT DOCUMENTS 568894  7/1954  Japan.
55-45607  3/1990  Japan.

Primary Examiner—Richard A. Bertsch
Assistant Examiner—Alfred Basilhas
Attorney, Agent, or Firm—Welsh & Katz, Ltd.

[57] ABSTRACT

An axial flow fan for ventilating electrical and electronic equipment includes a brushless, DC external rotor-type central drive motor. The stator is supported by a bearing tube formed of plastic, integrally molded with a mounting flange. In one embodiment, the fan casing forms part of the integral plastic molding.

13 Claims, 4 Drawing Sheets

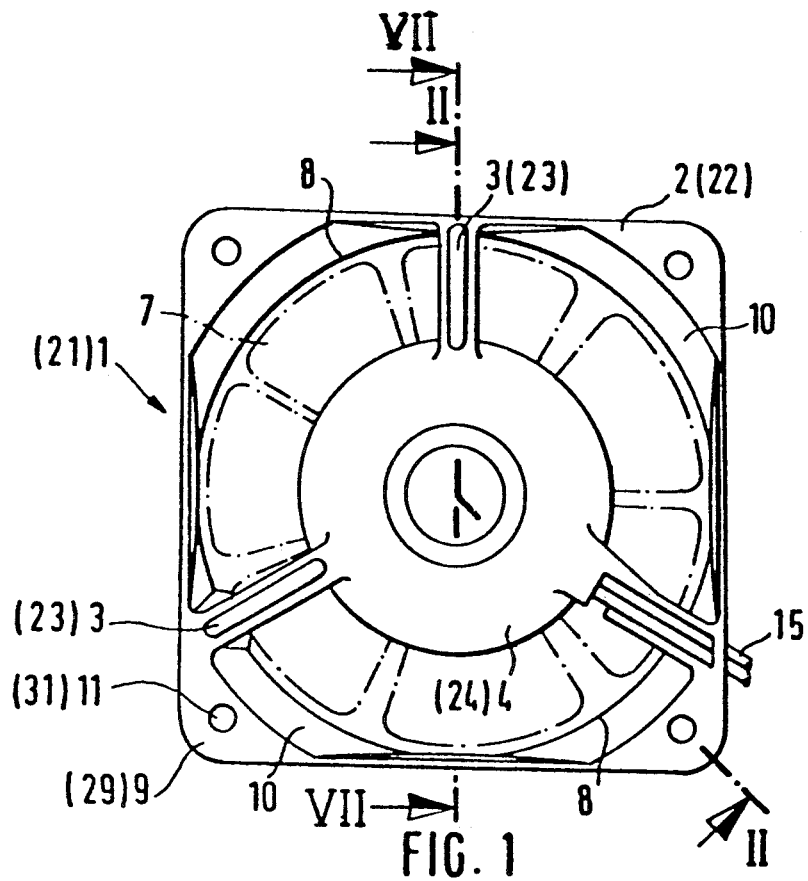
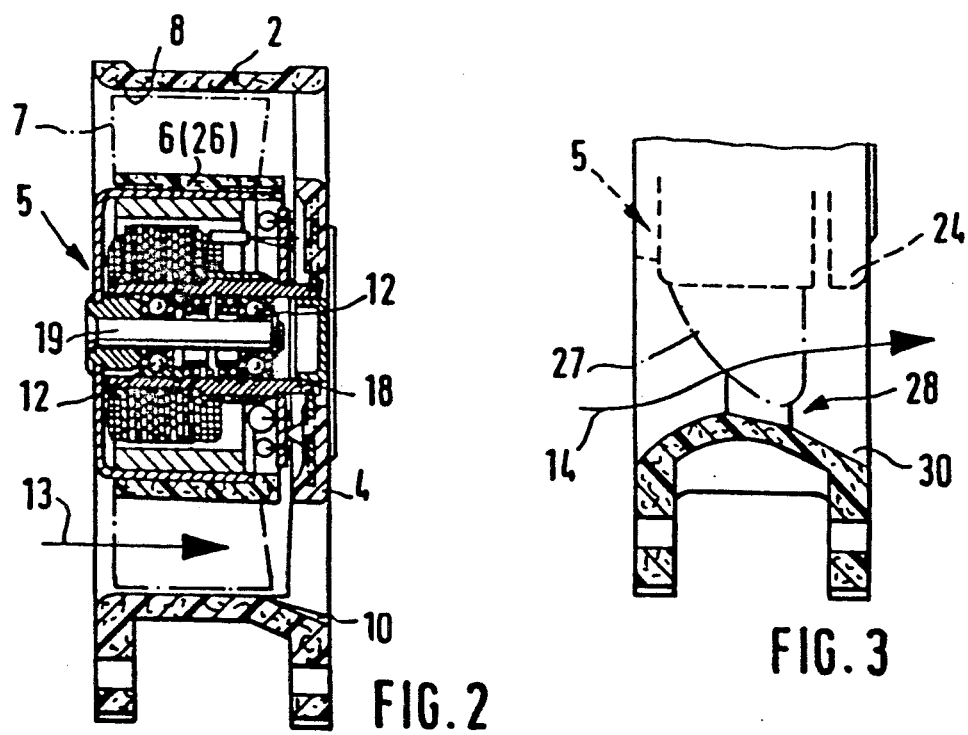
FIG. 1
FIG. 2
FIG. 3

MINIATURIZED DIRECT CURRENT FAN

This application is a continuation of application Ser. No. 377,748, filed Jul. 6, 1989, now U.S. Pat. No. 5,028,216, which is a continuation of Ser. No. 068,741, filed Jun. 25, 1987, now abandoned, which is a continuation of Ser. No. 845,481, filed Mar. 27, 1986, now abandoned, which is a continuation of Ser. No. 634,677, filed Jul. 30, 1984, now abandoned, which is a continuation of Ser. No. 466,960, filed Feb. 16, 1983, now abandoned.

The invention relates to a miniaturized direct current fan, particularly for ventilating electrical or electronic equipment.

Numerous miniaturized direct current fans are known and these generally have a polygonal contour, usually that of a square in an axial plan view on the rotor axis. In such a standardized parallelepipedic casing, there are also standardized mounting holes, quadratically spaced in the corner area of the square contour of the casing. Generally, such blowers are constructed as axial-flow blowers, i.e. the feed direction is parallel to the rotor axis of the drive motor arranged centrally in the casing area. It is not only the square lateral length of the casing, but also the axial length of the square, i.e. the fan casing length in the feed direction, which is generally standardized.

Such fans, generally called electronic fans and constructed in the form of axial-flow blowers, have been used for roughly two decades and are usually operated with alternating current. However, there has of late been an increasing demand for direct current operation of such fans. Alternating current drives for such fans are already known in connection with very small dimensions, an improvement in efficiency being obtained by increasing the frequency. There are also already direct current drives for very small fans. However, such known solutions have a disadvantageous service life, because they are driven with brush motors and external, complicated electronics are required.

The problem of the invention is to provide in connection with a very small fan, particularly an axial-flow fan of the aforementioned type with dimensions of less than 80×80×35 mm, an economically advantageous blower unit for direct current operation which has a very long service life, low consumption, a compact overall arrangement (i.e. the complete drive electronics for the fan can be housed in the square area), a high blower efficiency, a good feed characteristic (volume per second under variable pressure) and a moderate power consumption (preferably approximately constant with variable speed).

The smaller the blower, particularly the axial-flow fan, the more noticeable the advantages in the case of a solution of this type. (However, the arrangement is not limited to axial-flow blowers, because the same advantage, at least with respect to the compactness of the motor to be driven and the integration of the motor electronics in the mounting flange of the motor can be obtained in the case of a very small diameter radial blower). However, the two combination features of motor and such a casing configuration have a particularly advantageous effect in the case of a very small fan, e.g. less than 70×70 mm and with an axial length of 15 to 30 mm.

Thus, such a motor has very reduced electronics, which can be economically and advantageously housed in the motor flange, particularly in the case of mass production so that, unlike in the case of known solutions, no external electronics are required.

In addition, the casing configuration with such a small fan and particularly with a ratio of the diameter of the central drive unit to the impeller diameter of approximately 1:2 (or greater than 0.5) is particularly advantageous, the latter applying equally to radial and axial-flow blowers.

Another independent solution is described, in which at least approximately the flow duct is shaped like a Venturi tube. Here again, the advantages of the solution according to the invention are particularly apparent with casing dimensions below 70×70×30 mm.

Embodiments of the invention are described hereinafter relative to the drawings, wherein show:

FIG. 1 is a plan view of the outlet side of the fan according to the invention.

FIG. 2 is a the section along line II—II of FIG. 1.

FIG. 3 is a the section along line II—II of FIG. 1 through a fan according to the invention with a different blow duct configuration.

Figure 4:
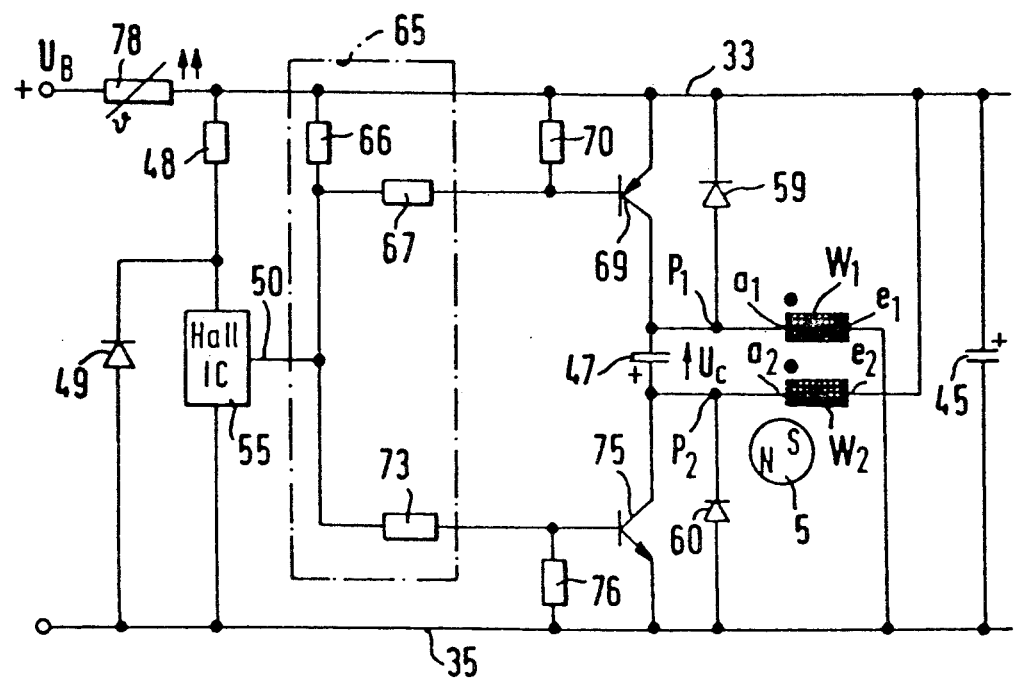
FIG. 4 is a another the circuit diagram of the drive motor.

A fan 1 (FIGS. 1 and 2) comprises a casing 2, whose webs 3 connect said casing 2 to a centrally arranged motor 5, via a flange 4. These webs 3 are positioned on the outlet side, so that the noise produced by the air movement is reduced. Casing 2, webs 3 and flange 4 are preferably constructed in one piece.

Motor 5 is an external rotor-type motor, which will be described in greater detail hereinafter. An impeller 6 is fixed (bonded or shrunk-on) to the outer casing of motor 5. Impeller 6 preferably has seven fan blades 7, which are distributed in irregular manner around the periphery, thereby damping annoying pure tones.

Between the fan blade 7 and the inner wall 8 of casing 2 is formed a substantially cylindrical flow duct. The external diameter of impeller 6 (outer fan blade diameter) is to be only slightly smaller than the diameter of the inner wall 8 of casing 2, in order to optimize the air flow (FIG. 2). Very good results are obtained if casing 2 and impeller 6, including its fan blade 7, are produced from glass fibre-reinforced plastic by the injection moulding process.

The feed capacity of the fan is further increased if, at least on the outlet side of the flow duct, widening takes place in the contour corners 9 of casing 2 in such a way the widened or enlarged portions 10 extend significantly beyond the diameter of impeller 6, 7. This corner widening particularly helps to improve the efficiency in the case of fans of this type (base area 62×62 mm, axial length 25 mm). On the inlet and/or outlet side of contour corners 9 are also provided mounting holes 11.

Ball bearings 12 are used for mounting the rotor of motor 5, which rotates at a speed of approximately 5000 r.p.m. Cheaper sliding bearings, which are used in the case of larger fans, are not suitable here, particularly due to the high speeds.

The ball bearings 12 are placed in a bearing tube 18, whose external diameter is reduced in the vicinity of the stator laminations, in order to obtain an adequate iron cross-section for the magnetic circuit there by means of the slot bottom in the stator, which should be as close as possible to rotor shaft 19. At one end, bearing tube 18 is fixed by rolling to flange 4, 24, which leads to further space saving. The flow direction is indicated by arrows 13 and 14.

Figure 7:
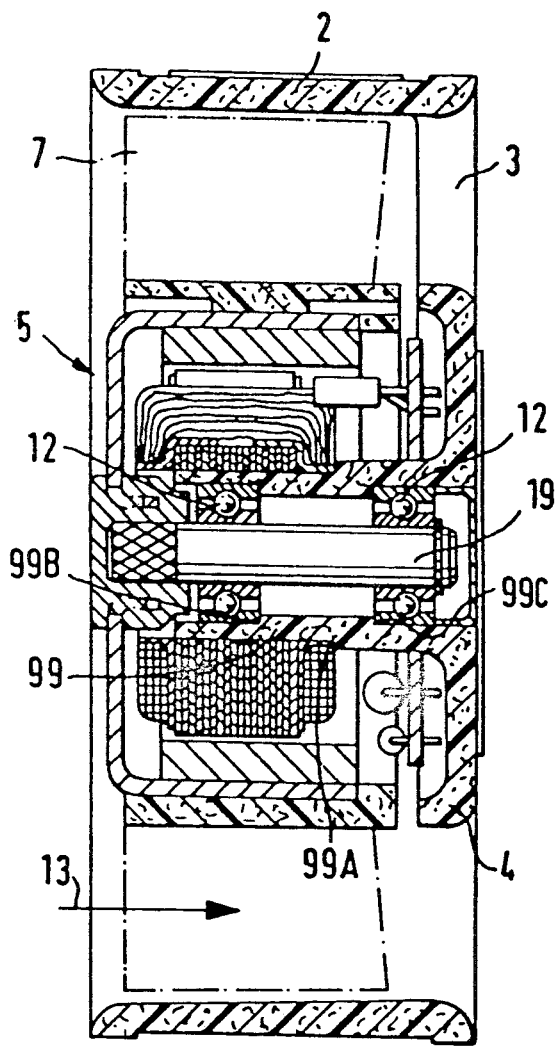
FIG. 7 is a modified embodiment with respect to FIG. 2, but also along section line VII—VII of FIG. 1.

Similar conditions exist in the case of the embodiment of FIG. 7, but in this case the bearing tubes 99 receiving bearings 12 is additionally injection moulded in one piece to flange 4 and surprisingly this has an adequate precision and thermal stability for continuous operation in conjunction with a commutatorless direct current motor operated in two-pulse manner. The casing, flange, webs and bearing tube form a single plastic moulding and bearing tube 99 has injection moulded shoulders 99A, 99B, 99C for the engagement of bearings and stator. In place of the aforementioned two-pulse, commutatorless d.c. motor with an auxiliary reluctance moment, which is advantageously constructed in accordance with U.S. Pat. No. 3,873,897 which is hereby incorporated into the present application, it is also possible to operate with a two-pulse commutatorless d.c. motor without an auxiliary reluctance moment, e.g. in accordance with U.S. Pat. No. 4,371,817 which is also incorporated into the present application. In conjunction with said motor, the central bearing tube can also be made from plastic and is moulded in one piece with the flange, webs and outer casing. However, particular advantages are obtained with a two-pulse, auxiliary reluctance moment motor, because its efficiency is particularly high (particularly if in accordance with U.S. Pat. No. 3,873,897) and its heating is correspondingly low, which conversely means a relatively high stability of the bearing tube.

FIG. 3 shows another embodiment according to the invention. A fan 21 comprises a casing 22, which has webs 23, which pass over into a flange 24, provided centrally with respect to the square base area of casing 22 (corresponding to FIG. 1). Casing 22 webs 23 and flange 24 are in one piece and a motor 25 is fixed to flange 24. An impeller 26 with fan blades 27 are fitted to the outer casing of the motor. In this case, the flow duct 28 is in the form of a Venturi tube and on the outlet side, in accordance with the embodiment of FIGS. 1 and 2 of flow duct 18, enlargements 30 are provided into the contour corners 29 of casing 22. On the inlet and outlet sides of contour corners 29, there are mounting holes 31 (spacing 50×50 mm).

Motor 5, 25 is a commutatorless d.c. motor for one or two-pulse operation with a so-called auxiliary reluctance moment, which is brought about in that the electrodynamic moment from the stator winding only has an a.c. field and the magnetic resistance of the magnetic circuit in the stator region is so modified over the rotation position of the impeller, that magnetic energy is stored for as long as the electrodynamic moment drives in pulsewise manner and in the pulse gaps, the stored magnetic energy is freed again by the cooperation of the rotor permanent magnets with the stator iron accompanied by torque formation. Such motors are described in detail in DAS 2,225,442 and German Patent 2,346,380 (Swiss Patent 597,715). The electronics for controlling such a motor (described in DOS 3,010,435.9) require fewer components than conventional d.c. motors of this type, so that it is possible to house within the external dimensions of casing 2, 22 of fan 1, 21 the electronics for commutating the motor.

Figure 6:
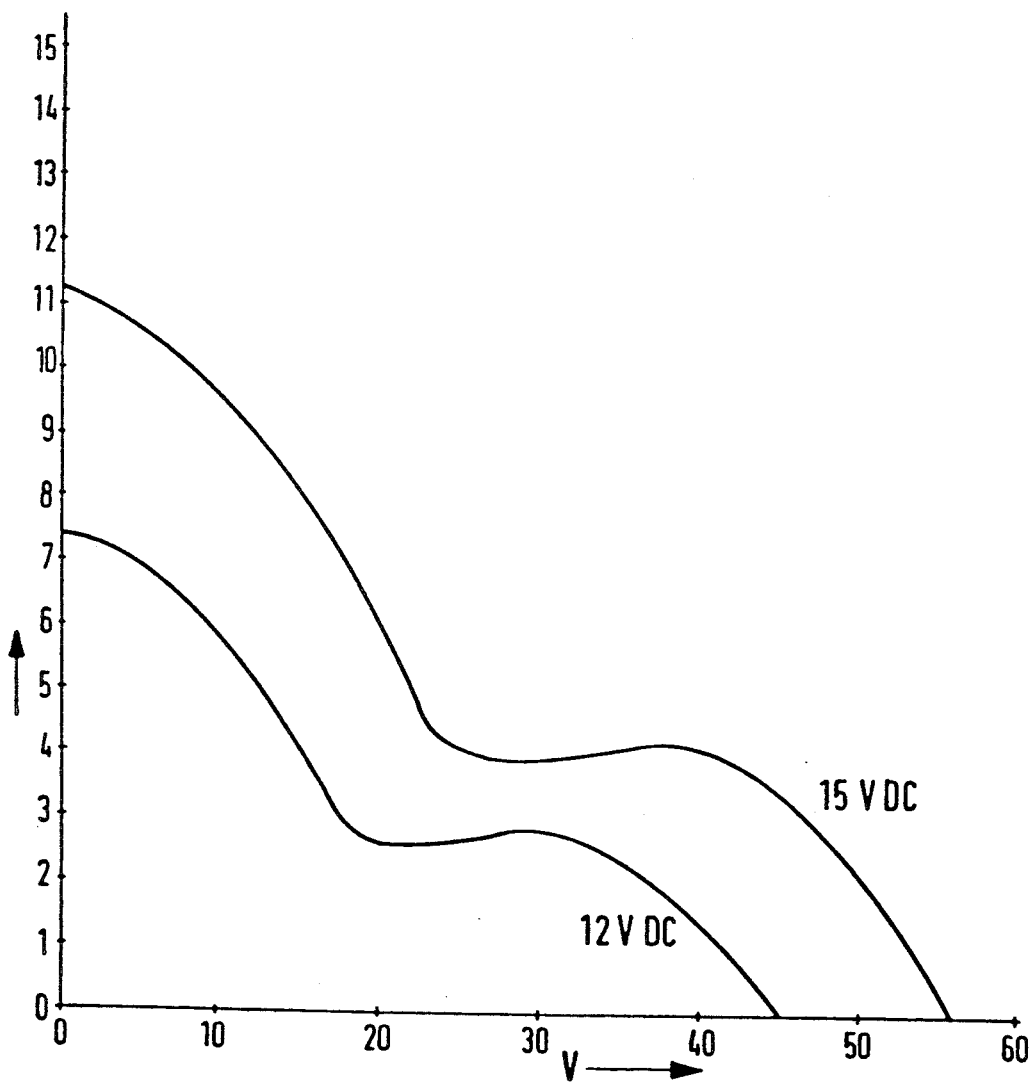
FIG. 6 is a diagram of the feed characteristic of the fan according to the invention.

To avoid unnecessary length, reference is made to the aforementioned publications (DAS 2,225,442, German Patent 2,346,380 and DOS 3,010,435) and particularly to FIGS. 6 and 7 of the latter. Due to lack of space, the relatively large capacitors 67, 74 (FIG. 6 of DOS 3,010,435) used for block securing purposes are omitted and replaced by a PTC-resistor 78 in the positive line 33.

FIG. 4 shows such a circuit, in which there is a matching network 65 comprising three resistors. From output 50 of Hall-IC's 55, a resistor 66 leads to the positive line 33, a resistor 67 to the base of a pnp-transistor 69, said base being connected across a bleeder resistor 70 to the positive line 33 to which is also applied the emitter of transistor 69. The Hall IC 55 serving as a rotor position-dependent sensor is connected with one terminal to the negative line 35 and with the other terminal, across a resistor 48 to the positive lines 33. Parallel thereto is provided a Zener diode 49, which regulates the voltage at Hall IC 55. In addition, from output 50, a resistor 73 leads to the base of an npn transistor 75, which is also connected across a bleeder resistor 76 to the negative line 35, to which is also applied the emitter of said transistor. The collector of transistor 69 is connected to terminal a1 of winding W1, while the collector of transistor 75 is connected to terminal a2 of winding W2. The by pass diodes 59 and 60 are connected in antiparallel to the associated transistors 69 or 75. Coupling capacitor 47 is positioned between terminals a1 and a2.

If on starting, a north pole faces Hall IC 55, its output potential becomes low and it approximately assumes the potential of negative line 35. Thus, a charging current flows across the emitter-base junction of transistor 69 and makes the latter conductive, so that a current flows in winding W1. If this current is subsequently switched off, the energy from winding W1 is recovered by coupling capacitor 47 and diode 60 via the transformer coupling. Transistor 75 is then conductively controlled. If the rotor is blocked, the conductive transistor 69 or 75 still receives part of the relatively high starting current, but very rapidly heats the PTC-resistor 78 located at the input, so that its resistance rises sharply in accordance with its characteristic curve and consequently the actual current in the blocked state is reduced to 10 to 20% of the "normal" short-circuit current value. Thus, the current acting on transistor 69, 75 is so low that they are not thermally endangered.

The circuit according to FIG. 4 represents an economically advantageous solution for such a miniaturized fan, because the relatively few components have to be housed in space-saving manner in the flange of the very small drive motor, despite fulfilling the requirements of blocking protection and protection against wrong poles (by means of the PTC-resistor 78 located at the input and which is also housed in this flange).

Figure 5:
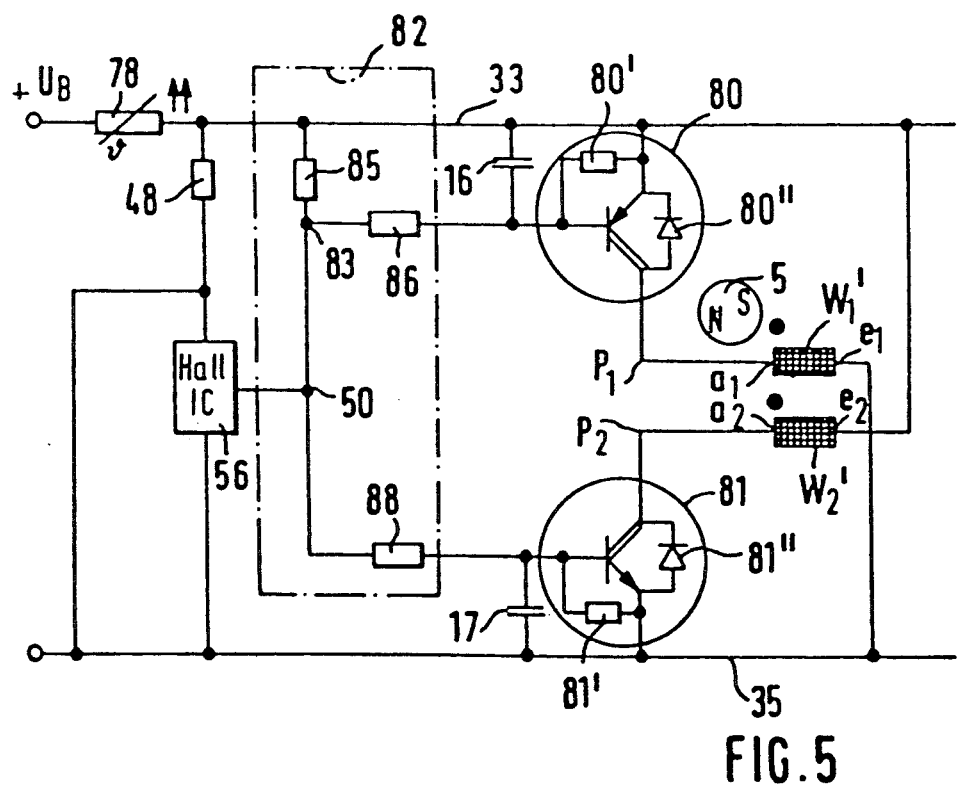
FIG. 5 is another circuit diagram of the drive motor.

A further reduction of the components is achieved with a circuit according to FIG. 5. A parallel-wire winding (so-called bifilar winding) makes it possible to use smaller capacitors, while the number of capacitors can be reduced. Through the use of the PTC-resistor 78 and the bifilar windings ($W_1'$, $W_2'$), there is no need for the capacitors 45, 47, 68, 74 used in DOS 3,010,435 (FIG. 6).

In place of the simple transistors 69, 75 according to FIG. 4, in this case complementary Darlington transistors 80, 81 are used and preferably those types already contained in the bleeder resistors 80', 81' and the by pass diodes 80", 81". As the Darlington transistors have a much greater current amplification than ordinary transistors, they can also be controlled with higher impedance RC-elements.

The Hall IC is constituted by a type having integrated voltage stabilization (e.g. UGN 3016 "Sprague"), so that diode 49 (FIG. 4) is rendered superfluous.

The resistance network 82 serving as a matching element can in principle be constructed here in the same way as network 65 of FIG. 4. Junction 83 is connected across a resistor 85 to the positive line 33, across a resistor 86 to the base of transistor 80 and across a resistor 88 to the base of transistor 81. The arrangement of capacitors 16, 17 between the bases of transistors 80, 81 and lines 33, 35 improves the switching behaviour.

The emitter of the pnp-transistor 80 is here again connected to the positive line 33, its collector is connected to terminal a1 of winding $W_1'$, and the emitter of the npn-transistor 81 is connected to the negative line 35, while its collector is connected to terminal a2 of winding $W_2'$.

FIG. 6 shows the feed characteristic of a fan according to the invention with external dimension 62×62×25mm and with a speed of 5000/6000 r.p.m. for 12/13 V d.c.

What is claimed Is:

1. A miniaturized, axially compact fan for ventilating electrical and electronic equipment, comprising:

a brushless, direct current, external rotor-type central drive motor having an inner stator, an outer rotor at least radially surrounding the stator, and a cylindrical air gap therebetween, said drive motor not exceeding a two-pulse operation and including electronics for controlling the motor, said motor having a central rotor shaft journalled in a bearing system mounted in an axially extending plastic bearing tube which is supported by a plastic mounting flange, said inner stator being configured to have an inner axially extending surface and said inner stator being mounted directly on the bearing tube for a substantial axial length of that inner surface closely surrounding a corresponding axial length of an outer surface of the bearing tube, at least the mounting flange and the bearing tube being formed together into one integral piece;

an impeller fastened to the outer rotor of said motor;

a fan casing supporting the mounting flange, said casing being in the form of a parallelepiped surrounding said impeller; and a flow duct formed by an inner wall of said casing around said impeller.

2. A miniaturized, axially compact fan for ventilating electrical and electronic equipment, comprising:

a brushless, direct current, external rotor-type central drive motor having an inner stator, an outer rotor at least radially surrounding the stator, and a cylindrical air gap therebetween, said drive motor not exceeding a two-pulse operation and including electronics for controlling the motor, said motor having a central rotor shaft journalled in a bearing system that includes at least two bearings directly mounted into an axially extending plastic bearing tube that is integral with and supported by a plastic mounting flange, said inner stator being configured to have an inner axially extending surface and said inner stator being mounted directly on the bearing tube for a substantial axial length of that inner surface closely surrounding a corresponding axial length of an outer surface of the bearing tube, at least the mounting flange as well as the bearing tube being formed together into one integral piece;

an impeller fastened to the outer rotor of said motor;

a fan casing supporting the mounting flange, said casing being in the form of a parallelepiped surrounding said impeller; and a flow duct formed by an inner wall of said casing around said impeller.

3. A miniaturized, axially compact fan for ventilating electrical and electronic equipment, comprising:

a brushless, direct current, external rotor-type central drive motor having an inner stator, an outer rotor at least radially surrounding the stator, and a cylindrical air gap therebetween, said drive motor not exceeding a two-pulse operation and including electronics for controlling the motor, said motor having a central rotor shaft journalled in a bearing system mounted in an axially extending plastic bearing tube that is supported by a plastic mounting flange, said inner stator being configured to have an inner axially extending surface and said inner stator being mounted directly on the bearing tube for a substantial axial length of that inner surface closely surrounding a corresponding axial length of an outer surface of the bearing tube, at least the mounting flange and the bearing tube being formed from one single piece;

an impeller fastened to the outer rotor of said motor;

a fan casing supporting the mounting flange, said casing being in the form of a parallelepiped surrounding said impeller; and a flow duct formed by an inner wall of said casing around said impeller.

4. A fan according to claim 1, 2 or 3, wherein said central drive motor includes an outer diameter having a ratio of not less that 0.5 to an outer diameter of said impeller;

the fan casing parallelepiped is no larger than a 70×70 mm square with mounting holes located quadratically in the corners of the casing, the axial length of the casing being between 15 to 30 mm; and the flow duct formed by the inner wall of said casing around said impeller is cylindrical, said outer diameter of said impeller being only slightly smaller than that of the inner wall said flow duct on its air output side being widened into the corners of the casing and increasing the diameter thereat significantly over that of the impeller.

5. A fan according to claim 4, wherein the base area of said casing is 62×62 mm and the axial length of the fan is 25 mm.

6. A fan according to claim 4, wherein the drive motor is for two-pulse operation with a magnetic resistance of the stator being variable over a rotation angle which produces an auxiliary reluctance moment, and being staggered in time with respect to an electrodynamic torque produced by the motor.

7. A fan according to claim 4, wherein the fan casing surrounding the impeller is formed in one piece on the flange, so that the casing, flange and bearing tube form a single plastic part.

8. A fan according to claim 7, wherein the stator includes only two winding coils that are constructed as bifilar windings.

9. A fan according to claim 1, 2 or 3, wherein said central drive motor includes an outer diameter having a ratio of not less than 0.5 to an outer diameter of said impeller;

the fan casing, in axial plan view, concentrically surrounds said impeller with a radial symmetrical contour and is no larger than a 70×70 mm square with mounting holes located quadratically in the corners of the casing, the axial length of the casing being between 15 to 30 mm; and the passage cross section of the flow duct at first decreases in the direction of air flow to a minimum in the manner of a Venturi tube and thereafter said flow duct on its output side is widenend into the corners of the casing and increases the diameter of its cross section thereat significantly over the minimum, the radical outer edges of the impeller mostly conforming to the shape of the casing inner wall.

10. A fan according to claim 9, wherein the base area of said casing is 62×62 mm and the axial length of the fan is 25 mm.

11. A fan according to claim 9, wherein the drive motor is two-pulse operation with a magnetic resistance of the stator being variable over a rotation angle which produces an auxiliary reluctance moment, being staggered in time with respect to an electrodynamic torque produced by the motor.

12. A fan according to claim 9, wherein the fan casing surrounding the impeller is formed in one piece on the flange, so that the casing, flange and bearing tube form a single plastic part.

13. A fan according to claim 12, wherein the stator includes only two winding coils that are constructed as bifilar windings.

* * * * *

UNITED STATES PATENT AND TRADEMARK OFFICE
CERTIFICATE OF CORRECTION

PATENT NO. : 5,135,363

DATED : August 4, 1992

INVENTOR(S) : Siegfried HARMSEN, et al.

It is certified that error appears in the above-identified patent and that said Letters Patent is hereby corrected as shown below:

On the Title Page of the patent, under the heading, "Attorney, Agent or Firm" delete "Welsh & Katz, Ltd." and insert --Fitch, Even, Tabin & Flannery--.

On the Title Page of the patent, under the heading "FOREIGN PATENT DOCUMENTS" change "3/1990" to read --3/1980--.

On the Title Page of the patent, under the heading "Assistant Examiner" change "Basilhas" to read --Basichas--.

Column 2, line 15, delete the word "show".

Column 2, line 22, delete "another the".

Column 3, line 37, after "Casing 22" insert a comma --,--.

Column 7, line 16, Claim 9, line 17, change "radical" to read --radial--.

Signed and Sealed this

Twenty-second Day of February, 1994

Attest:

BRUCE LEHMAN

*Attesting Officer*  *Commissioner of Patents and Trademarks*